(12) United States Patent
Varghese et al.

(10) Patent No.: US 11,540,217 B2
(45) Date of Patent: Dec. 27, 2022

(54) DYNAMIC WIRELESS CONNECTION CONFIGURATION FOR REDUCING POWER CONSUMPTION

(71) Applicant: CARRIER CORPORATION, Palm Beach Gardens, FL (US)

(72) Inventors: Joshua Varghese, Ottawa (CA); Phani Pavan Kumar Mangaiahgari, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/815,385

(22) Filed: Mar. 11, 2020

(65) Prior Publication Data
US 2020/0229097 A1 Jul. 16, 2020

(30) Foreign Application Priority Data
Jan. 15, 2019 (IN) .............................. 201911001719

(51) Int. Cl.
*H04W 52/02* (2009.01)
*H04W 48/18* (2009.01)
*H04W 48/12* (2009.01)

(52) U.S. Cl.
CPC ....... *H04W 52/0235* (2013.01); *H04W 48/18* (2013.01)

(58) Field of Classification Search
CPC ............. H04W 52/0235; H04W 48/18; H04W 52/0229; H04W 48/12; Y02D 30/70
USPC ....................................................... 370/311
See application file for complete search history.

(56) References Cited

U.S. PATENT DOCUMENTS

| | | |
|---|---|---|
| 6,934,540 B2 | 8/2005 | Twitchell, Jr. |
| 7,420,952 B2 | 9/2008 | Da Costa et al. |
| 8,060,017 B2 | 11/2011 | Schlicht et al. |
| 8,542,620 B2 | 9/2013 | Sampathkumar |
| 8,594,638 B2 | 11/2013 | Sturdivant et al. |
| 8,611,268 B1 | 12/2013 | Thandaveswaran |
| 8,611,323 B2 | 12/2013 | Berger et al. |

(Continued)

FOREIGN PATENT DOCUMENTS

| | | |
|---|---|---|
| CN | 103529793 B | 12/2015 |
| CN | 105007260 B | 3/2018 |

(Continued)

OTHER PUBLICATIONS

How to wake up an access point,, Dareen, Shehadeh (Year: 2016).*
How to wake up an access point,, Dareen, Shehadeh (Year: 2016) (Year: 2016).*

*Primary Examiner* — Inder P Mehra
(74) *Attorney, Agent, or Firm* — Cantor Colburn LLP

(57) ABSTRACT

Methods and systems for dynamic wireless communication are provided. Aspects include receiving, by a first controller of a first device, a first activation signal from an activation device, responsive to receiving the first activation signal, transitioning the first device from a low power state to a high power state, broadcasting, by the first device, a second activation signal to a second controller of a second device, broadcasting, by the first device, a wireless network, wherein the first device comprises an access point for the wireless network, receiving, from the second device, a request to join the wireless network, and granting, by the first device, access to the wireless network for the second device.

14 Claims, 4 Drawing Sheets

(56) References Cited

U.S. PATENT DOCUMENTS

| | | |
|---|---|---|
| 8,817,704 B2 | 8/2014 | Ito et al. |
| 8,902,867 B2 | 12/2014 | Horn et al. |
| 8,929,822 B2 | 1/2015 | Jung et al. |
| 9,232,466 B2 | 1/2016 | Chang |
| 9,277,481 B2 | 3/2016 | Laroia et al. |
| 9,295,099 B2 | 3/2016 | Twitchell, Jr. et al. |
| 9,380,638 B2 | 6/2016 | Mandiganal et al. |
| 9,543,998 B2 | 1/2017 | Honjo et al. |
| 9,736,703 B2 | 8/2017 | Goldsmith et al. |
| 9,986,492 B2 | 5/2018 | Katar et al. |
| 2011/0128143 A1* | 6/2011 | Daniel ............... G08B 21/0261 455/12.1 |
| 2012/0203918 A1* | 8/2012 | Berenberg ............ H04W 12/06 709/229 |
| 2014/0267900 A1* | 9/2014 | Francisco ........ H04N 21/43635 348/441 |
| 2016/0223382 A1* | 8/2016 | Luber ................. G01F 23/0007 |
| 2017/0278061 A1* | 9/2017 | Skaaksrud ............. H04L 67/12 |
| 2020/0092804 A1* | 3/2020 | Patwardhan ...... H04W 52/0209 |

FOREIGN PATENT DOCUMENTS

| | | |
|---|---|---|
| CN | 104581725 B | 11/2018 |
| GB | 2502966 A | 12/2013 |

\* cited by examiner

DYNAMIC WIRELESS CONNECTION CONFIGURATION FOR REDUCING POWER CONSUMPTION

CROSS-REFERENCE TO RELATED APPLICATIONS

This application claims the benefit of Indian Patent Application number 201911001719 filed Jan. 15, 2019, which is incorporated herein by reference in its entirety.

BACKGROUND OF THE INVENTION

The subject matter disclosed herein relates to refrigeration systems. More specifically, the subject matter disclosed herein relates to refrigeration of containers utilized to store and ship cargo.

Goods are often transported across great distances, sometimes using a variety of different modes of transportation. One common method of transporting goods in such a manner is the use of intermodal shipping containers. Such containers are of a standardized size, such that multiple containers are easily handled and stacked. A common size is 8 feet (2.44 m) wide by 8 feet, 6 inches (2.59 m) high, with a length of either 20 feet (6.1 m) or 40 feet (12.2 meters). Other lengths can be used, such as 45 feet (13.7 m), 48 feet (14.6 m), and 53 feet (16.2 m). The benefit of standardized intermodal containers is that goods can be shipped from a variety of different locations without ever having to be removed from the container. The container itself is moved to and from a trailer, rail carrier, or ship.

Some containers include computerized portions. For example, a refrigerated container can have a computer that is used to monitor or control the refrigeration unit. The computer could, for example, change the temperature of the refrigerated container. In addition, the container can monitor the refrigerated container. One can determine the maximum temperature reached in the container, the status of the refrigerant or any electronics of the computer.

An issue that can occur is that it can be difficult to access the computer of each container. Intermodal shipping containers are typically constructed such that they are stackable and can be packed in tight quarters. Therefore, there can be 6 to 12 containers in a single stack of containers. To maximize the number of containers on a ship or at a shipping facility, the containers can be placed very close to each other. Accessing a single container in such a configuration can be difficult.

BRIEF DESCRIPTION OF THE INVENTION

According to one embodiment, a method is provided. The method includes receiving, by a first controller of a first device, a first activation signal from an activation device, responsive to receiving the first activation signal, transitioning the first device from a low power state to a high power state, broadcasting, by the first device, a second activation signal to a second controller of a second device, broadcasting, by the first device, a wireless network, wherein the first device comprises an access point for the wireless network, receiving, from the second device, a request to join the wireless network, and granting, by the first device, access to the wireless network for the second device In addition to one or more of the features described above, or as an alternative, further embodiments of the method may include receiving, over the wireless network, data from the second controller.

In addition to one or more of the features described above, or as an alternative, further embodiments of the method may include receiving, from the activation device, a request to join the wireless network and granting, by the first device, access to the wireless network for the activation device.

In addition to one or more of the features described above, or as an alternative, further embodiments of the method may include transmitting, by the first device over the wireless network, the data from the second controller to the activation device.

In addition to one or more of the features described above, or as an alternative, further embodiments of the method may include responsive to transmitting the data from the second controller to the activation device, transitioning the first device from the high power state to the low power state.

In addition to one or more of the features described above, or as an alternative, further embodiments of the method may include that the first controller is associated with a shipping container.

In addition to one or more of the features described above, or as an alternative, further embodiments of the method may include that the activation device comprises an interface coupled to the shipping container.

In addition to one or more of the features described above, or as an alternative, further embodiments of the method may include that the activation device comprises at least one of smart phone, tablet, and computer.

In addition to one or more of the features described above, or as an alternative, further embodiments of the method may include that the second activation signal includes credential data for connecting to the wireless network.

In addition to one or more of the features described above, or as an alternative, further embodiments of the method may include that the first device comprises a radio.

According to one embodiment, a system is provided. The system includes a first controller of a first device, the first controller configured to receive a first activation signal from an activation device, responsive to receiving the first activation signal, transitioning the first device from a low power state to a high power state, broadcast, by the first device, a second activation signal to a second controller of a second device, broadcast, by the first device, a wireless network, wherein the first device comprises an access point for the wireless network, receive, from the second device, a request to join the wireless network, and grant, by the first device, access to the wireless network for the second device.

In addition to one or more of the features described above, or as an alternative, further embodiments of the system may include that the first controller is further configured to receive, over the wireless network, data from the second controller.

In addition to one or more of the features described above, or as an alternative, further embodiments of the system may include that the first controller is further configured to receive, from the activation device, a request to join the wireless network and grant, by the first device, access to the wireless network for the activation device.

In addition to one or more of the features described above, or as an alternative, further embodiments of the system may include that the first controller is further configured to transmit, by the first device over the wireless network, the data from the second controller to the activation device.

In addition to one or more of the features described above, or as an alternative, further embodiments of the system may include that the first controller is further configured to responsive to transmitting the data from the second controller to the activation device, transition the first device from the high power state to the low power state.

In addition to one or more of the features described above, or as an alternative, further embodiments of the system may include that the first controller is associated with a shipping container.

In addition to one or more of the features described above, or as an alternative, further embodiments of the system may include that the activation device comprises an interface coupled to the shipping container.

In addition to one or more of the features described above, or as an alternative, further embodiments of the system may include that the activation device comprises at least one of smart phone, tablet, and computer.

In addition to one or more of the features described above, or as an alternative, further embodiments of the system may include that the second activation signal includes credential data for connecting to the wireless network.

In addition to one or more of the features described above, or as an alternative, further embodiments of the system may include that the first device comprises a radio.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
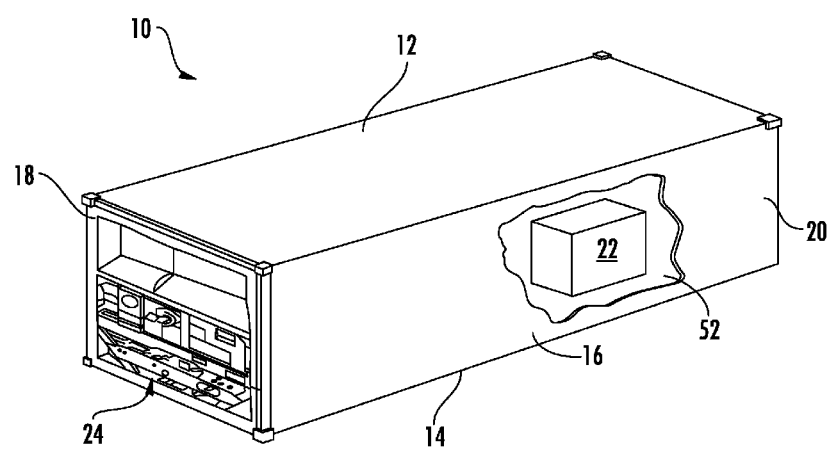
FIG. 1 is a schematic illustration of an embodiment of a refrigerated transportation cargo container.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located in the interior 52 of the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes a compressor, a condenser, an expansion valve, an evaporator, and an evaporator fan, as well as other ancillary components. The cargo container 10 described herein is merely exemplary and not intended to limit the application, uses, and/or technical scope of the present disclosure, which can be embodied in various forms known in the art. The container might be in the harbor/terminal, not always in transit.

Figure 2:
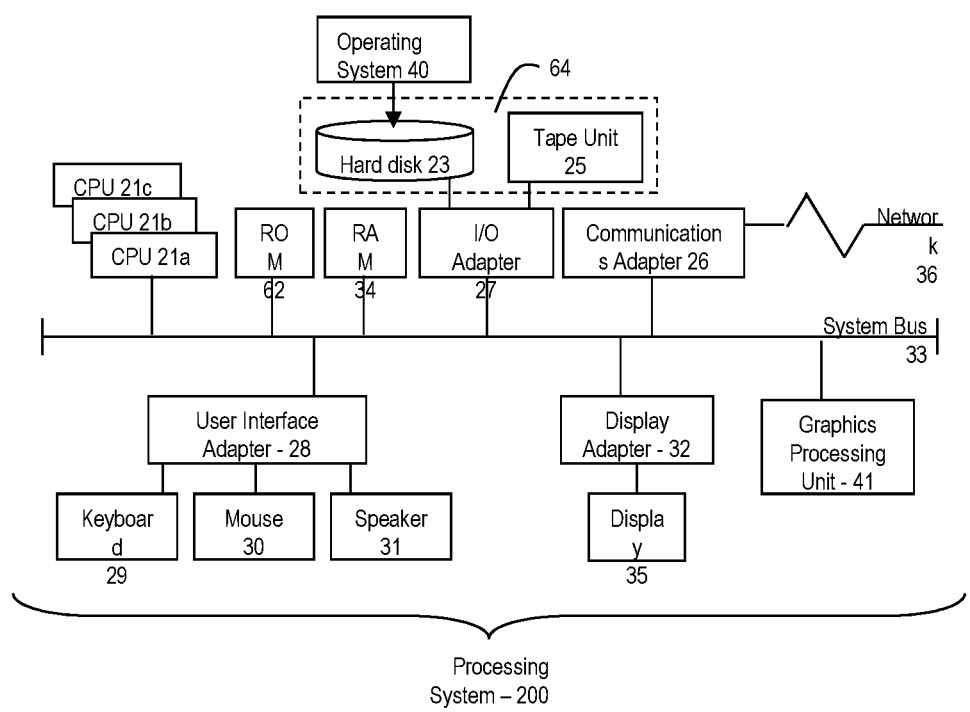
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 62 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 64. Operating system 40 for execution on the processing system 200 may be stored in mass storage 64. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as storage device controllers, hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 64, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

In one or more embodiments, the processing system 200 can be utilized in a thermostat, controller, or other component in the refrigeration unit 24 in FIG. 1, for example.

Turning now to an overview of technologies that are more specifically relevant to aspects of the disclosure, as described above, intermodal shipping containers are very useful for shipping goods through long distances, without the need to load and unload a single container multiple times through the journey. Certain intermodal containers are computerized, such as refrigerated intermodal containers. It can be desirable to access the computer of an intermodal shipping container to control or monitor the container. However, it can be difficult to do so.

It could be possible to establish a wireless connection to the computer system in the container. Once established, a user or field engineer can access information associated with the container. This can assist with accessing the containers that may be stacked 6 to 12 containers high. However, a difficulty arises because, typically, the containers, when stacked on the shipyard, operate on battery power. The controllers on these containers have embedded wireless hardware that can be operated as a wireless access point or operated to connect to a wireless access point or work on a peer to peer network or mesh network or simultaneously in multiple modes. However, embedded wireless on the container controllers consume a considerable amount of power when operating as either an access point or when connecting to a wireless network. With the controllers operating on battery power, keeping these wireless cards active or "on" can drain the battery relatively quickly.

Turning now to an overview of the aspects of the disclosure, one or more embodiments address the above-described shortcomings of the above described technologies by providing systems and methods for dynamic wireless connection configuration in containers which also benefits from a reduction in power consumption. To accomplish this reduction in power the container controllers operate the wireless cards in one of two modes. The first mode is a low-power mode where the wireless cards are turned off or are utilizing minimal power. The second mode is a wireless mode where the wireless card can act as either a wireless access point or as a wireless client. This second mode consumes more power from the container battery than the first mode. In one or more embodiments, the container controllers can operate the wireless cards in the first mode by default. The second mode is activated responsive to an activation signal received by a transceiver associated with the container controller. The activation signal can originate from a user device operated by a field engineer, for example. The activation signal can also designate what type of wireless functionality is needed (e.g., access point or wireless client). In one or more embodiments, a container controller can operate the wireless card as an access point and utilize a transceiver to transmit a second activation signal to nearby other containers to have the other container controller operate their wireless cards as a wireless client or both simultaneously. In addition, a user device operated by a field engineer can connect to the access point. Once the user device and all containers within range of the wireless access point are connected to this network, the user device can download data associated with the containers in a shipyard or other location. By utilizing one container as an access point and the other containers as a wireless client, this allows for a field engineer to obtain data associated with various containers that are typically, as described above, difficult to gain access to. For example, containers can be stacked up to 12 containers high. A field engineer can access an access point container close to the bottom of the stack and activate the wireless card through the container controller to become an access point for one or more all containers in the stack to connect to. Once all containers are connected to the network, the field engineer can download the data needed for these containers in the stack instead of having to try to collect data from each container one at a time.

Figure 3:
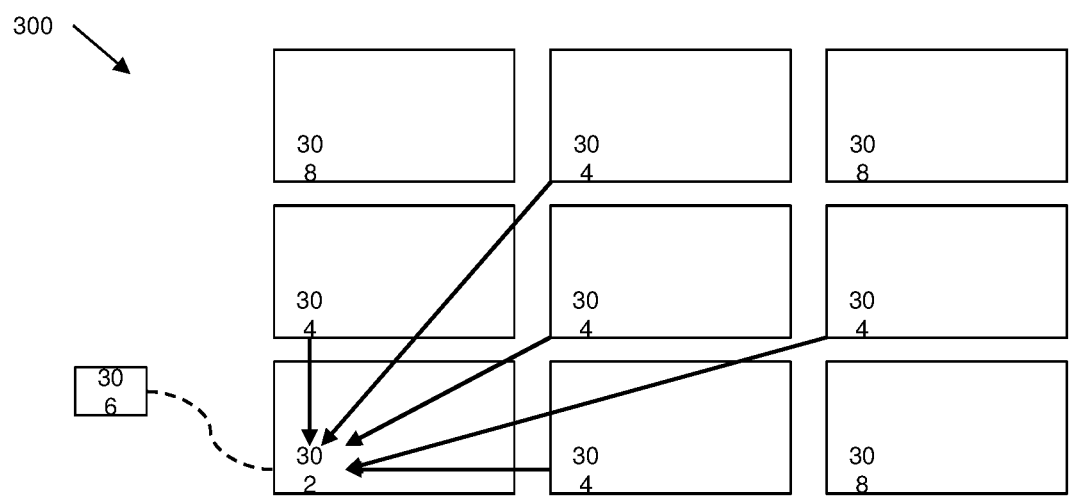
FIG. 3 depicts a block diagram depicting a group of shipping containers each including a container controller having a wireless card embedded with the container controller according to one or more embodiments of the disclosure.

Turning now to a more detailed description of aspects of the present disclosure, FIG. 3 depicts a block diagram depicting a group of containers 300 each including a container controller having a wireless card embedded in the controller according to one or more embodiments. The container controllers also include a transceiver. In one or more embodiments, an activation device 306 is utilized to transmit an activation signal to an access point container 302. The activation signal can be received by a transceiver on the access point container 302 controller. The activation signal notifies the controller to activate a wireless unit/card/hardware embedded on the controller for the access point container 302. The wireless unit/card/hardware, before the activation signal, operates in a low-power mode to save on battery power for the access point container 302. As described above, the wireless card can act as a wireless access point or can be a wireless client connected to another access point. The access point container 302, typically nearest to the activation device 306, is set as the access point. Once set as the access point, the access point container 302 wireless card can transmit a second activation signal to the other containers 304 within range to activate their respective wireless cards to operate as a wireless client and connect to the access point broadcasted from the access point container 302. Once the other containers 304 are connected to the access point, the activation device 306 can then obtain the data associated with each container 302, 304 through the access point. In one or more embodiments, the activation device 306 can be a user device such as, for example, a smart phone, tablet, or laptop. In one or more embodiments, the activation device 306 can be a keypad or other interface on the access point container 302 which can receive an input from the user or field engineer to directly activate the wireless card on the access point container 302 controller or transmit an activation signal to a transceiver on the access point container 302 controller. In one or more embodiments, the access point container 302 can receive data from each of the other containers 304. The data can include content data for the containers as well as other relevant data such as configuration data, etc. The data can be collated by the access point container 302 controller and then transmitted to the activation device 306.

In one or more embodiments, once on the activation signal, the network can be formed immediately regardless of whether the controller is in low power mode. Also, once the activation signal is sent, one or more of the units may get connected to wireless infrastructure like routers/gateways provided by the customer or manufacturer. In one or more embodiments, the access point container 302 can be the container closest to a user or field engineer operating the activation device 306.

In one or more embodiments, the activation signal transmitted by the activation device 306 can be received by a transceiver that can be operated in a low power mode prior to receiving the activation signal. The activation signal thus "wakes up" the transceiver which then notifies the container controller to activate the wireless card. The container controller transitions the wireless card from a low power mode to a high power mode. Or, in other embodiments, the transceiver can activate the wireless card directly to turn on the wireless card (e.g., transition from low power mode to a high power mode). Similarly, the second activation signal broadcast by the transceiver can activate or "wake up" transceivers on the other containers 304 which then activate their wireless cards either directly or by the controllers on the other containers 304. The illustrated example includes containers 308 not associated with the access point container 302. These containers 308 might not be from the same company owning the access point container 302 or the other containers 304. In one or more embodiments, the activation device 306 can send an activation signal that includes credentialing data which allows for the activation device 306 to connect to the access point container 302 controller through the associated wireless card. The activation device 306 can also include credentialing data for the other containers 304 to allow for access to the access point broadcasted by the access point controller 302. For example, if six of nine container in a shipyard belong to Company A, the activation device 306 can utilize tokens for each container to have access to the access point. These tokens would be transmitted to the containers within range but only to containers owned by Company A.

In one or more embodiments, the activation device 306 can utilize a value taken from the access point container 302 in order to activate the wireless card on the access point container 302. The value taken from the access point container 302 can be the container number written on the outside of the container or could come from a barcode on the container. This value along with a token can be utilized in sending the activation signal. For example, if the access point container 302 belongs to Company A, then the Company A can have internal tokens for activating the wireless card and sharing data with the activation device. In embodiments, this token can be included with the value associated with the container to ensure that a specific container is activated as an access point. In one or more embodiments, the transceiver can be a BLUETOOTH™ low-energy beacon that can transmit an identifier to the activation device 306 to be utilized to configure the access point for the access point container 302. The token can be generated dynamically and/or statically in the container. This token along with one or more pieces of information like container ID can be encrypted and sent in a beacon.

In one or more embodiments, the container controllers, transceivers, wireless cards, and activation device can be implemented on the processing system 200 found in FIG. 2. Utilization of an access point controller 302 to connect to other containers 304 allows for energy efficiency as the operation of the wireless card in client mode utilizes less energy than in access point mode. This allows for the other containers 304 to not utilize as much power by having to become an access point to allow for the activation device 306 to connect to collect the data associated with the shipping containers. In addition, operating in client mode is more secure than operation in access point mode so the less containers needed to operate in access point mode, the more secure. Also, by having less access point containers, there is less interference in a densely populated area like shipyards and dockyards.

Figure 4:
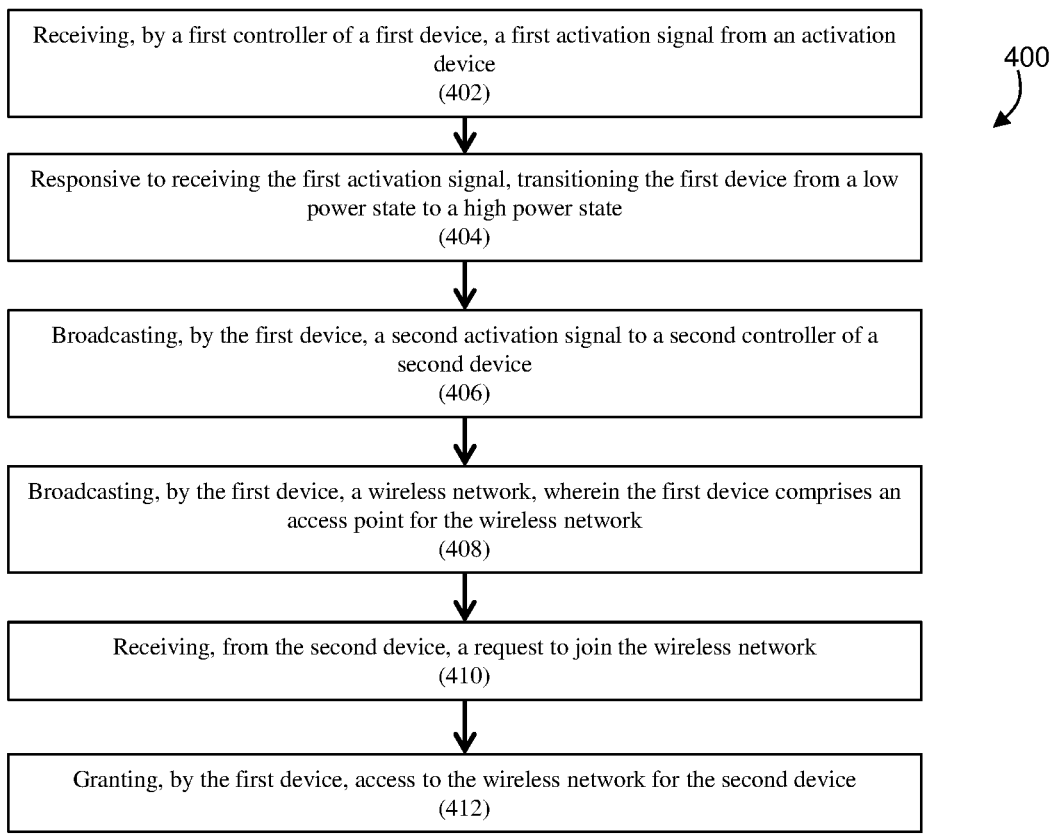
FIG. 4 depicts a flow diagram of a method for dynamic wireless communication according to one or more embodiments of the disclosure.

FIG. 4 depicts a flow diagram of a method for dynamic wireless communication according to one or more embodiments. The method 400 includes receiving, by a first controller of a first device, a first activation signal from an activation device, as shown in block 402. And responsive to receiving the first activation signal, the method 400 includes transitioning the first device from a low power state to a high power state, as shown at block 404. At block 406, the method 400 includes broadcasting, by the first device, a second activation signal to a second controller of a second device. The method 400 then, at block 408, includes broadcasting, by the first device, a wireless network, wherein the first device comprises an access point for the wireless network. The method 400 also includes receiving, from the second device, a request to join the wireless network, shown at block 410. And at block 412, the method 400 includes granting, by the first device, access to the wireless network for the second device.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method for dynamic wireless communication, the method comprising:
   receiving, by a first controller of a first device, a first activation signal from an activation device, wherein the first controller is associated with a first shipping container, and wherein the activation device comprises an interface coupled to the first shipping container;
responsive to receiving the first activation signal, transitioning the first device from a low power state to a high power state;
transmitting, by the first device, a second activation signal to a second controller of a second device, wherein the second controller is associated with a second shipping container, wherein the second activation signal includes credential data, and wherein the credential data comprises an internal token with a container number associated with the first shipping container;
responsive to receiving the second activation signal, transitioning the second device from a second low power state to a second high power state;
broadcasting, by the first device, presence of a wireless network;
receiving, from the second device, a request to join the wireless network; and
granting, by the first device, access to the wireless network for the second device based on the second controller supplying the credential data to the first device;
wherein the second device operates as a wireless client on the wireless network, the first device operates as an access point for the wireless network.

2. The method of claim 1, further comprising receiving, over the wireless network, data from the second controller.

3. The method of claim 2, further comprising:
receiving, from the activation device, a request to join the wireless network; and
granting, by the first device, access to the wireless network for the activation device.

4. The method of claim 3, further comprising transmitting, by the first device over the wireless network, the data from the second controller to the activation device.

5. The method of claim 1, further comprising:
responsive to transmitting the data from the second controller to the activation device, transitioning the first device from the high power state to the low power state.

6. The method of claim 1, wherein the activation device further comprises at least one of smart phone, tablet, and computer.

7. The method of claim 1, wherein the first device comprises a radio.

8. A system for dynamic wireless communication, the system comprising:
a first controller of a first device, the first controller configured to:
receive a first activation signal from an activation device, wherein the first controller is associated with a first shipping container, and wherein the activation device comprises an interface coupled to the first shipping container;
responsive to receiving the first activation signal, transitioning the first device from a low power state to a high power state;
transmit, by the first device, a second activation signal to a second controller of a second device, wherein the second controller is associated with a second shipping container, wherein the second activation signal includes credential data, and wherein the credential data comprises an internal token with a container number associated with the first shipping container;
responsive to receiving the second activation signal, transition the second device from a second low power state to a second high power state;
broadcast, by the first device, presence of a wireless network;
receive, from the second device, a request to join the wireless network; and
grant, by the first device, access to the wireless network for the second device based on the second controller supplying the credential data to the first device;
wherein the second device operates as a wireless client on the wireless network, the first device operating as the access point for the wireless network.

9. The system of claim 8, wherein the first controller is further configured to:
receive, over the wireless network, data from the second controller.

10. The system of claim 9, wherein the first controller is further configured to:
receive, from the activation device, a request to join the wireless network; and
grant, by the first device, access to the wireless network for the activation device.

11. The system of claim 10, wherein the first controller is further configured to:
transmit, by the first device over the wireless network, the data from the second controller to the activation device.

12. The system of claim 8, wherein the first controller is further configured to:
responsive to transmitting the data from the second controller to the activation device, transition the first device from the high power state to the low power state.

13. The system of claim 8, wherein the activation device further comprises at least one of smart phone, tablet, and computer.

14. The system of claim 8, wherein the first device comprises a radio.

* * * * *